H. A. DIERKES.

Call-Bells,

No. 5,822. Reissued April 7, 1874.

Witnesses:

J. Fraser.

Arthur C. Fraser.

Inventor:

Henry A. Dierkes

AM. PHOTO-LITHOGRAPHIC Co. N. Y. (OSBORNE'S PROCESS.)

UNITED STATES PATENT OFFICE.

HENRY A. DIERKES, OF NEW YORK, N. Y.

IMPROVEMENT IN CALL-BELLS.

Specification forming part of Letters Patent No. 147,486, dated February 17, 1874; reissue No. 5,822, dated April 7, 1874; application filed March 24, 1874.

*To all whom it may concern:*

Be it known that I, HENRY A. DIERKES, of the city, county, and State of New York, have invented certain new and useful Improvements in Bells, of which the following is a specification:

The object of my invention is to produce a bell, more especially adapted for use as a table or call bell, of simple and convenient operation, and attractive appearance; and it consists in the combination, with one or more bells, of a hand-wheel, so applied and arranged in connection therewith as to operate the hammers and ring the bell or bells when the said wheel is rotated, or partly rotated, upon its axis; and in the arrangement of a wheel between two bells placed mouth to mouth; and in other novel features, hereinafter described.

Figure 1:
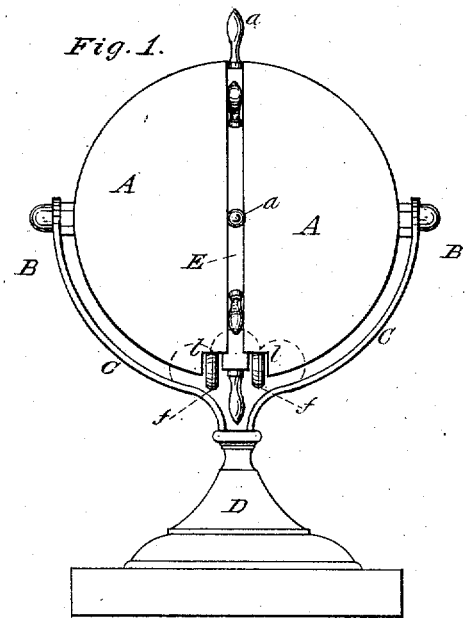
Figure 2:
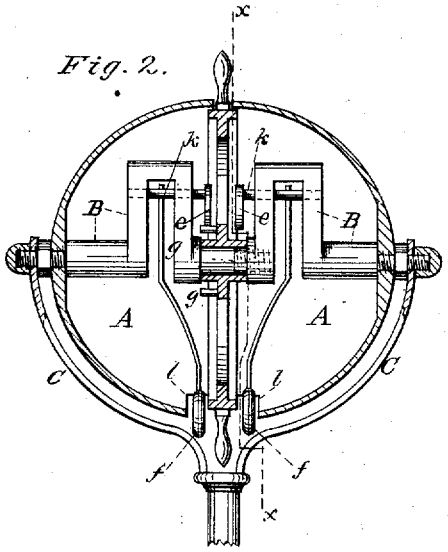

Figure 1 of the accompanying drawings is an elevation of my improved bell, viewed on a line with the periphery of the hand-wheel. Fig. 2 is a longitudinal section of the same; and Fig. 3 is a transverse view on lines *x x* of Figs. 1 and 2, one of the bells being removed, and the axial rod and one of the supporting-arms being in section.

As shown in the drawings, A A are two hemispherical or gong-shaped bells, mounted on, and secured immovably to, the cranked axial rod B, passing centrally through them, and which is also secured immovably to the curved and flexible supporting-arms C C, which rise from the base or standard D. Upon the center of the axial rod B is mounted the hand-wheel E, which is arranged to revolve thereon within the bells, preferably between the mouths of the same, the handles *a a* of the wheel passing between the mouths, and projecting beyond the exterior of the bells, as shown. The bells are arranged, preferably, so close together that space enough is left for the handles only of the wheel to pass through and allow the same to freely rotate. The periphery of the wheel lies within the bells, as shown, and close to the interior sides of the same, so that the small space between the mouths of the two bells is thus closed, and the interior mechanism concealed from view. The axial rod B is cranked, as shown in Fig. 2, and in the cranked portions are pivoted small rock-shafts or pins *k k*, from which depend the hammers *f f* and cranks or cams *e e*. The cams *e e* project toward the hub of the wheel, and are alternately struck by projecting pins *g g* on the hub of the wheel when the same is rotated, and are oscillated thereby, causing the hammers to strike and ring the bells. This will be understood on reference to Fig. 2 and to Fig. 3, where the hammer is shown upon the point of striking.

Instead of the rock-shafts *k k*, spring-wire may be used for the hammer-rods, and the same actuated by the direct contact of the pins *g g*; and a straight axial rod may be used in lieu of a cranked one.

Figure 3:
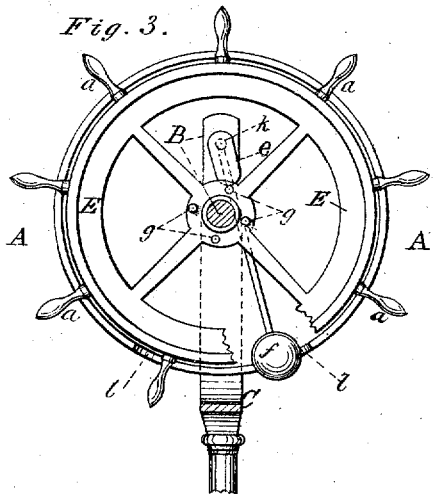

A portion on the lower side of each bell is cut away, as shown at *l l*, Figs. 1, 2, and 3, forming an open space, in which the hammers swing and ring the bell by striking against the edges of the projecting portion; but, if preferred, the hammers may be arranged to swing inside the bells, and the slot or opening be dispensed with. In the former case, the base may be extended upward in an ornamental floral or other design, so as to cover and conceal this open space, as represented by the dotted lines in Fig. 1.

By the use of the recesses *l l* the hammers are made to strike the bell upon its edge, and thereby produce a clearer sound. They also allow the hammers a larger swing, so that the stroke will be more effective; and, by striking upon the edges of the bells the same are not so liable to be fractured or injured by wear as if struck upon the inner surface.

To ring the bell it is only necessary to move one of the handles *a a* with the finger when the wheel will then revolve, and its momentum will vibrate the hammers and keep the bell ringing for several seconds.

In this way I produce a bell of extremely unique character and ornamental appearance, and of very simple and facile operation.

I do not wish to confine myself to the particular mechanism herein shown by which the hand-wheel is made to operate the hammers, as other methods of accomplishing this result may be readily devised; and the wheel and hammers may be connected with each other in a positive manner by eccentrics, cams, cranks, or other devices. Nor do I wish to confine myself to the particular form of bell shown; but

What I claim as my invention, and desire to secure by Letters Patent, is—

1. In combination with two bells, arranged mouth to mouth, a wheel arranged to rotate in a plane parallel with the mouth of the bells, to operate the striking mechanism for sounding the bells.

2. In combination with one or more bells, a wheel, or its equivalent, operating by its rotation directly on the striking mechanism, substantially as and for the purpose set forth.

3. In combination with the bell or bells and their striking mechanism arranged within them, a wheel, or its equivalent, arranged within, or partially within, the bell or bells, to operate the striking mechanism when rotated, as set forth.

4. In combination with the two bells A A, arranged mouth to mouth, and with suitable striking mechanism, the wheel E, arranged to revolve between the bells, as and for the purpose set forth.

5. In combination with the hammers *f f*, the gong or gongs A A, having recesses *l l*, wherein the hammers swing.

6. In combination with the wheel E, or its equivalent, bell or bells A A, rod B, and hammers *f f*, the pins *g g*, cams *e e*, and rods *k k*, substantially as and for the purpose set forth.

In witness whereof I have hereunto signed my name in the presence of two subscribing witnesses.

HENRY A. DIERKES.

Witnesses:
J. FRASER,
ARTHUR C. FRASER.